May 7, 1946.   C. E. EVERETT   2,399,795
POWER TAKE-OFF FOR TRACTORS
Filed Feb. 6, 1943

INVENTOR.
CHARLES E. EVERETT
BY
ATTORNEY

Patented May 7, 1946

2,399,795

UNITED STATES PATENT OFFICE 2,399,795

POWER TAKE-OFF FOR TRACTORS

Charles E. Everett, Racine, Wis., assignor to The Massey-Harris Company, Racine, Wis., a company of Maryland Application February 6, 1943, Serial No. 475,037

1 Claim. (Cl. 74—11)

The present invention relates to tractors having a power take-off shaft and means for operating the tractor and power take-off shaft simultaneously or individually through individual clutches.

In the early development of modern tractors, no power take-off shafts were provided because implements at that time were not power driven. Many implements were adapted to be pulled only by the tractor. If power was needed, it was taken from the bull wheel or carrying wheels of the implement.

All implements requiring power are now adapted to be driven by the tractor and tractors used to pull such implements are equipped with power take-off shafts.

It is frequently desirable to stop the tractor without stopping the implement and either drive or stop the implement when the tractor is standing. It may be desirable at times to stop the implement without stopping the tractor and it is frequently desirable to shift the gears of the tractor without effecting the power connection to the implement.

From the foregoing, it will be seen that the tractor transmission connection to the engine must be through a clutch and the power connection from the engine to the power take-off shaft must also be through a clutch.

My device was devised to meet the foregoing conditions which are the principal objects of my invention.

I accomplish the foregoing by means of a tractor transmission which is spaced a distance from the engine and having an operating connection to the engine by means of a clutch which is mounted on the transmission and a shaft which extends to the engine and is splined thereto, and by means of another clutch which is operatively connected directly to the engine and a sleeve which is rotatably mounted on the shaft having an operating connection to the power take-off shaft, the sleeve having another sleeve which is slidably mounted thereon and operatively connected to the other clutch.

An object of the present invention is to provide convenient pedals or levers within easy reach of the operator so the operator may engage the clutches independently or simultaneously.

Another object of my invention is to rotatably mount the power take-off shaft and tractor transmission shaft in bearings, the transmission shaft bearing being adjacent the rear end of the first sleeve forming a strong, simple, and efficient driving connection for the tractor transmission and the power take-off shaft.

To these and other useful ends, my invention consists of parts, combinations of parts, or their equivalents, and mode of operation, as hereinafter set forth and claimed and shown in the accompanying drawing in which:

Figure 2:
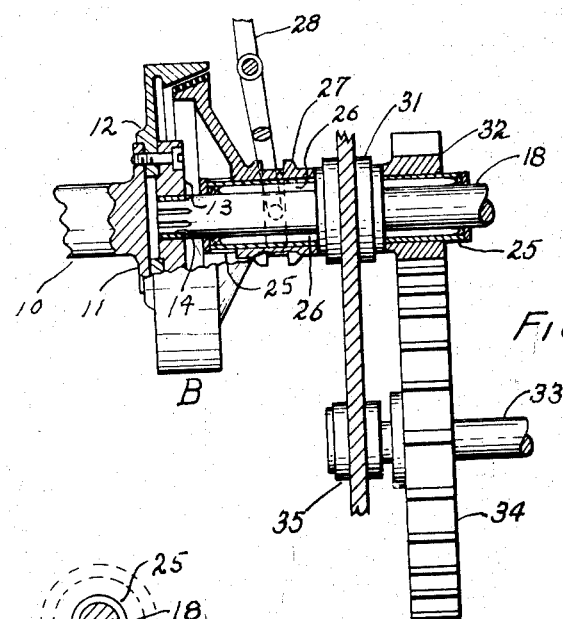
Fig. 2 is a view somewhat similar to Figure 1 and being shown partially in section.
Figure 3:
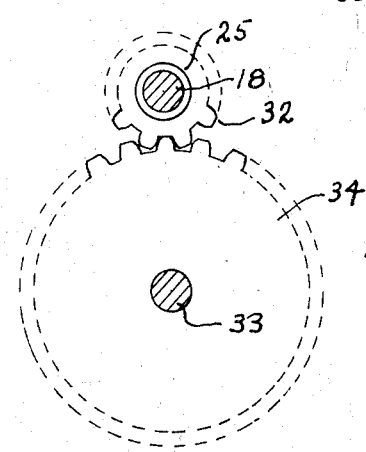
Figure 3 is a sectional view taken on line 3—3 of Figure 1.

As thus illustrated, reference character A designates the tractor transmission and clutch in their entireties and B designates the power take-off clutch in its entirety. Numeral 10 designates a fraction of the crank of the engine having a flange 11 at its rear end to which fly-wheel 12 is secured in the usual manner. Clutch B is operatively connected directly to fly-wheel 12 as illustrated in Figure 2.

I provide a flanged member 13 which is secured to fly-wheel 12 and flange 11 and having a splined opening 14. The tractor transmission per se is designated by numeral 15 having a forwardly protruding shaft (not shown) to which clutch member 16 is operatively secured. The shaft that extends from transmission 15 to the differential of the tractor is designated by numeral 17.

A shaft 18 has an operating connection to clutch 16, its forward end being splined to member 13 (see Figure 2); thus the engine drives transmission 15 through clutch 16, this clutch having a conventional slidable member 19 on member 18 which is operated preferably by means of a foot pedal lever 20.

Transmission 15 may comprise the usual gear shifts and be operated exactly the same as the conventional tractor, differing only in that pedal 20 is preferably somewhat in rear of the engine and within easy reach of the operator.

Shaft 18 is provided with a sleeve 25 which is rotatably mounted on the shaft preferably by means of a needle bearing as illustrated in Figure 2 having at its front end a clutch sleeve 27 which is slidably mounted and splined on sleeve 25 as illustrated with the usual operating connections to the clutch and a manually operated lever 28. To provide means for conveniently operating the two clutches independently or simultaneously from the operators' seat, the operating means may be in juxtaposition.

Figure 1:
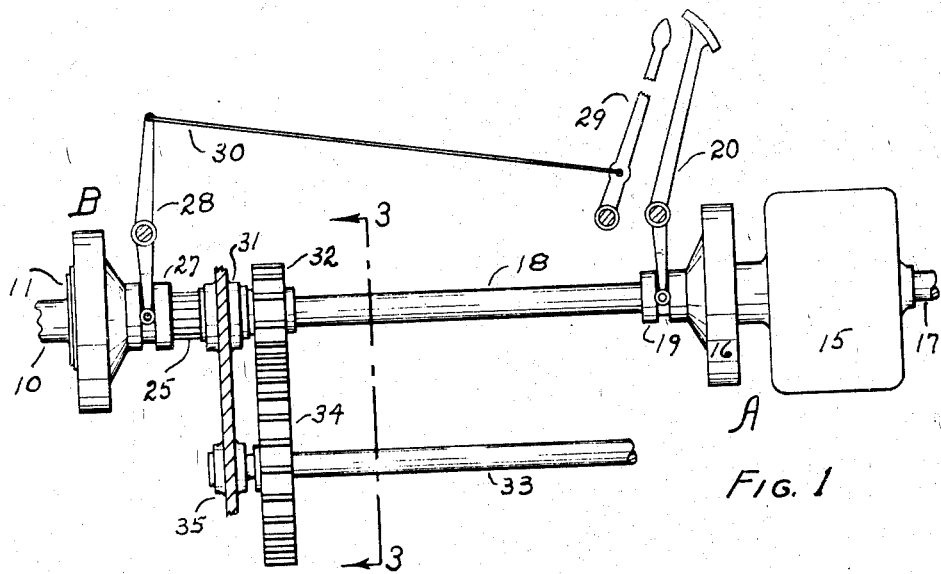
Fig. 1 is a side elevational view showing a fraction of the engine and a fraction of the power take-off shaft and the connection between the engine and power take-off shaft.

The clutch B operating means, as shown in Figure 1 is preferably a lever 29 having a link 30 which forms an operating connection to lever 28. In some designs, I may reverse the position of levers 20 and 29 so the pedal and lever are positioned near clutch B. The arrangement of the pedal and lever depends entirely upon the position of the operator's seat on the tractor.

As illustrated, the clutches are independent of each other and may be engaged independently or simultaneously for a purpose which will hereinafter appear; however clutch 16 is preferably spring engaged automobile-like and clutch B is preferably manually engaged similar to clutches used on machinery.

Sleeve 25 is preferably rotatably mounted in a bearing 31 preferably near the rear end of the sleeve. I mount a gear pinion 32 on the rear end of sleeve 25 and supply a power take-off shaft 33 having a gear 34 which forms an operating connection between shaft 33 and sleeve 25, this shaft being rotatably mounted at its forward end in a bearing 35.

It will be seen that clutch B will act to form an operating connection from the engine to shaft 33 and clutch 16 will act to form a direct operating connection from the engine to transmission 15, the clutches having, as already described, individual manual operating means.

Clearly the tractor may be operated the same as an automobile through a transmission and a pedal controlled clutch and the power take-off shaft may be operated through a clutch which is thrown in and out by means of a hand operated lever.

Bearings 31 and 35 may be positioned directly in rear of pinion 32 and gear 34 with shaft 19 rotatably mounted directly in bearing 31 or sleeve 25 may protrude through pinion 32 and be rotatably mounted in the bearing. In some tractors, I may elect to dispense with bearing 31 and shorten the sleeve and position pinion 32 on the rear of the shortened sleeve.

Clearly many minor detail changes may be made without departing from the spirit and scope of the present invention as recited in the appended claim.

Having thus shown and described my invention, I claim:

A power take-off and transmission for tractors, comprising in combination, a tractor frame, an engine mounted on the forward end of the frame, a tractor transmission mounted on the frame a distance from the engine, a clutch mounted on the forward end of said transmission, a shaft forming an operating connection between said clutch and engine, a sleeve rotatably mounted on the forward end of said shaft, a clutch forming an operating connection between the fly-wheel of the engine and the forward end of said sleeve, a power take-off shaft positioned a distance from and parallel to said first shaft, gears forming a permanent operating connection between said sleeve and power take-off shaft, separate manually operated means associated with each said clutch, whereby said transmission clutch and power take-off clutch may at any time be engaged or disengaged independently or simultaneously by the operator of the tractor.

CHARLES E. EVERETT.